United States Patent
Nebel (10) Patent No.: US 6,592,163 B1
(45) Date of Patent: Jul. 15, 2003

(54) RELEASABLE DRIVE FOR A SLIDE-OUT ROOM OF A RECREATIONAL VEHICLE

(76) Inventor: Michael W. Nebel, Rte. 3, Box 6-A, Smith Center, KS (US) 66967

( * ) Notice: Subject to any disclaimer, the term of this patent is extended or adjusted under 35 U.S.C. 154(b) by 0 days.

(21) Appl. No.: 10/139,116

(22) Filed: May 3, 2002

(51) Int. Cl.$^7$ ............................... B60P 3/34; G05G 5/06
(52) U.S. Cl. ..................... 296/26.01; 296/165; 74/527; 74/526; 74/528; 74/529; 74/530
(58) Field of Search ............................. 296/26.01, 165, 296/170, 172, 173, 176, 26.12, 26.13; 74/527, 526, 528, 529, 530

(56) References Cited

U.S. PATENT DOCUMENTS

| | | |
|---|---|---|
| 2,327,980 A | 8/1943 | Bryant |
| 2,605,481 A | 8/1952 | Burkhart |
| 2,621,543 A | 12/1952 | Rossmann |
| 3,103,830 A | 9/1963 | Allaira |
| 3,203,690 A | 8/1965 | Werner |
| 3,791,071 A | 2/1974 | Niklaus |
| 3,915,492 A * | 10/1975 | Agnese |
| 4,085,629 A | 4/1978 | Fogarollo |
| 4,137,796 A | 2/1979 | Bostrom |
| 4,659,140 A | 4/1987 | Fuerst et al. |
| 4,841,812 A | 6/1989 | Fuerst et al. |
| 4,928,547 A | 5/1990 | Huyer |
| 5,074,162 A | 12/1991 | Yanusko |
| 5,101,684 A | 4/1992 | Mosslacher |
| 5,758,918 A | 6/1998 | Schneider et al. |
| 5,833,296 A * | 11/1998 | Schneider ............... 296/26.13 |
| 5,902,001 A | 5/1999 | Schneider |
| 5,984,396 A | 11/1999 | Schneider |
| 6,116,671 A | 9/2000 | Schneider |
| 6,152,520 A | 11/2000 | Gardner |
| 6,415,675 B1 * | 7/2002 | Schneider et al. ....... 296/26.13 |
| 6,454,336 B1 * | 9/2002 | Nye et al. ............... 296/26.13 |

* cited by examiner

*Primary Examiner*—D. Glenn Dayoan
*Assistant Examiner*—H. Gutman
(74) *Attorney, Agent, or Firm*—Shughart, Thomson & Kilroy, P.C.

(57) ABSTRACT

A drive assembly for a slide-out room of a recreational vehicle includes a drive train with a drive gear and an output gear. An electric motor is connected to the drive gear. A drive shaft is slidably received through a center hole in the output gear so as to be longitudinally movable relative to the output gear. A clutch operates to engage the drive shaft with the output gear as the drive shaft is moved in a first direction and to disengage the drive shaft from said output gear as the drive shaft is moved in a second direction. A drive member connected to a first end of the drive shaft is engageable with a room actuation mechanism, and a crank handle is removably connectable to a second end of the drive shaft.

17 Claims, 4 Drawing Sheets

RELEASABLE DRIVE FOR A SLIDE-OUT ROOM OF A RECREATIONAL VEHICLE

BACKGROUND OF THE INVENTION

1. Field of the Invention

This invention relates to a releasable drive used to power a room actuating mechanism which extends and retracts a slide-out room of a recreational vehicle.

2. Description of the Related Art

Recreational vehicles often include a slide-out room which is movable between extended and retracted positions. The slide-out room remains retracted during transit of the vehicle and is extended when the vehicle is parked to increase the usable floor space within the vehicle. Movement of the slide-out room is usually accomplished by an electric motor acting through a gear drive. The gear drive is often provided with a manual back-up, such as a crank handle, which can be used to retract or extend the room in case of loss of electric power or other failure of the electric motor.

A problem with current gear drives is that the electric motor remains engaged with the gear drive when the manual back-up is being employed. Therefore, as an operator turns the crank handle, the motor is also being turned. The motor thus provides resistance to the operation of the manual back-up which makes it more difficult for the operator to turn the crank handle.

Another problem with current gear drives occurs if the internal geartrain of the gear drive becomes damaged, such as if teeth are sheared off of one of the gears. Under these circumstances, it may become impossible to move the slide-out room using either the motor or the manual back-up. This can present a particularly awkward problem if the room is extended and the vehicle must be removed.

What is needed is a release mechanism for a gear drive which allows the operator to disconnect the motor and the internal geartrain of the drive when the manual back-up is being used. This will make the crank handle easier to turn under all operating conditions, and will allow the manual back-up to operate even if the geartrain becomes damaged.

SUMMARY OF THE INVENTION

The present invention comprises a drive assembly for a slide-out room of a recreational vehicle. The drive includes a gearbox containing a drive train with at least a drive gear and an output gear. An electric motor is connected to the drive gear. The output gear has a center hole formed therethrough which receives a drive shaft. The drive shaft is movable relative to the output gear in opposed first and second longitudinal directions. A drive member connected to a first end of the drive shaft is engageable with a room actuation mechanism and a second end of the drive shaft is engageable by a crank handle for manual operation of the room actuation mechanism.

A clutch connected to the drive shaft is operable to engage the drive shaft with the output gear as the drive shaft is moved in the first longitudinal direction and disengage the drive shaft from the output gear as the drive shaft is moved in the second longitudinal direction. The clutch may comprise a pin extending radially outward from the drive shaft acting in cooperation with a notch formed in a face of the output gear so as to extend radially outward from the center hole. The pin is receivable within the notch to engage the drive shaft with the output gear.

Three embodiments of the invention are disclosed, each of which includes a shift mechanism for selectively moving the drive shaft between an engaged position wherein the drive shaft is engaged with the output gear and a disengaged position wherein the drive shaft is disengaged from the output gear.

In the first embodiment, the shift mechanism includes a washer fixedly attached to the drive shaft so as to extend radially outward therefrom and a spring biasing the drive shaft in the second longitudinal direction. A shift block is slidably mounted adjacent the drive shaft and includes a transverse groove which receives a portion of the washer. A jack screw connected to the shift block is operable to selectively move the shift block in the first and second longitudinal directions. By turning the jack screw in a first rotational direction, an operator can causes an edge of the groove to engage the washer and move the drive shaft in the first longitudinal direction against the bias of the spring, thereby causing the pin in the drive shaft to disengage from the output gear. Conversely, by turning the jack screw in a second rotational direction opposite the first rotational direction, the operator can allow the spring to urge the drive shaft in the second longitudinal direction, thereby causing the pin to re-engage the output gear.

The second embodiment of the invention also includes a washer fixedly attached to the drive shaft so as to extend radially outward therefrom. A shift lever is mounted adjacent the drive shaft for pivotal movement about its proximate end. An opening having opposed, inwardly curved, edges is formed in the shift lever. The opening receives a portion of the washer. Pivoting the shaft lever in a first direction moves the drive shaft in the first longitudinal direction causing the pin in the drive shaft to disengage from the output gear. Pivoting the shift lever in a second direction opposite the first direction moves the drive shaft in the second longitudinal direction causing the pin to re-engage with the output gear. The device further includes a latch plate having a first notch and a second notch, the first notch engages a portion of the shift lever when the drive shaft is in the engaged position and the second notch engaging a portion of the shift lever when the drive shaft in the disengaged position.

In the third embodiment, the shift mechanism includes a washer fixedly attached to the drive shaft so as to extend radially outward therefrom and a spring biasing the drive shaft in the second longitudinal direction. A shift block is slidably mounted adjacent the drive shaft and includes a bore which slidably receives the drive shaft. A threaded rod connected to the shift block is engaged by a nut operable to selectively move the shift in the first and second longitudinal directions. By turning the nut in a first rotational direction, an operator can causes an edge of the shift block to engage the washer and move the drive shaft in the first longitudinal direction against the bias of the spring, thereby causing the pin in the drive shaft to disengage from the output gear. Conversely, by turning the nut in a second rotational direction opposite the first rotational direction, the operator can allow the spring to urge the drive shaft in the second longitudinal direction, thereby causing the pin to re-engage the output gear.

DETAILED DESCRIPTION OF THE PREFERRED EMBODIMENTS

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. The drawings constitute a part of this specification and include exemplary embodiments of the present invention and illustrate various objects and features thereof.

Certain terminology will be used in the following description for convenience in reference only and will not be limiting. For example, the words "upwardly," "downwardly," "rightwardly," and "leftwardly" will refer to directions in the drawings to which reference is made. The words "inwardly" and "outwardly" will refer to directions toward and away from, respectively, the geometric center of the embodiment being described and designated parts thereof. Said terminology will include the words specifically mentioned, derivatives thereof and words of a similar import.

Figure 1:
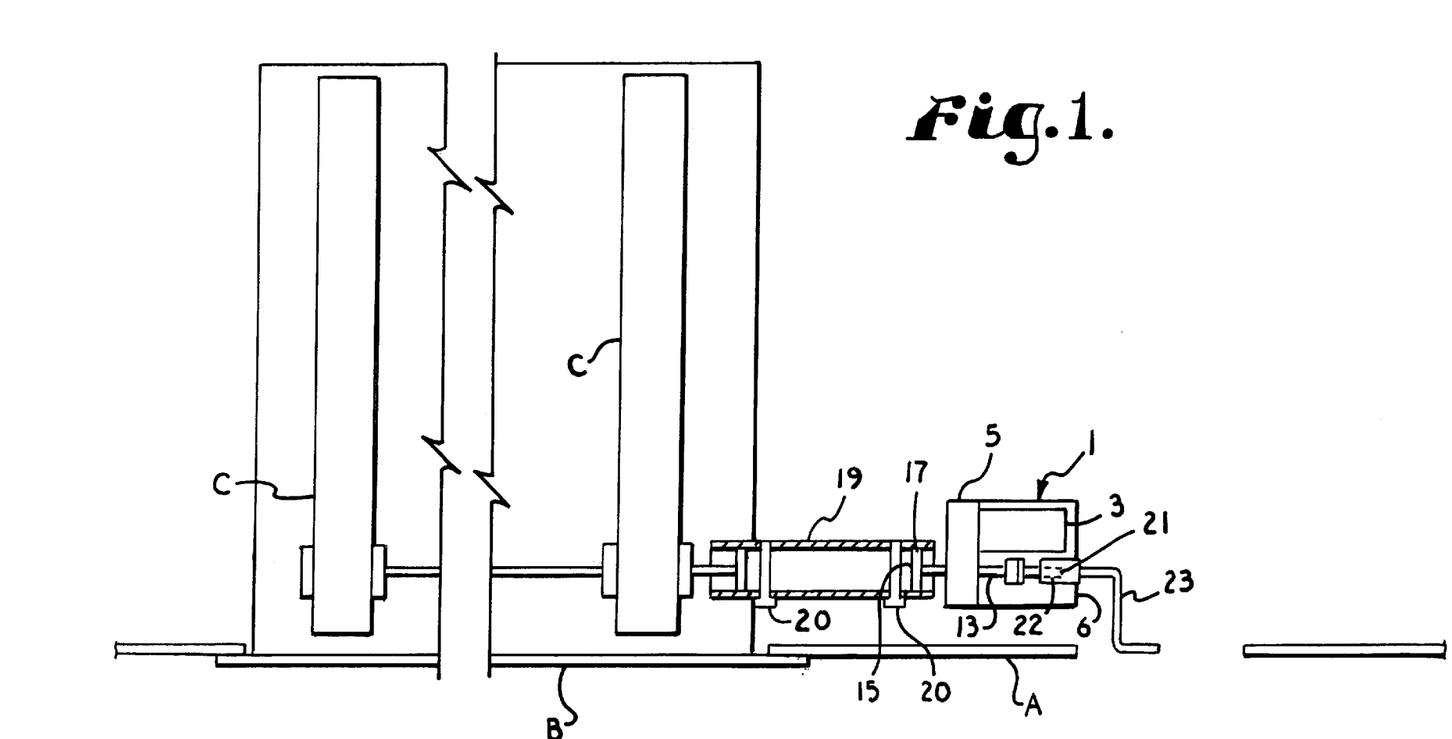
FIG. 1 is a partially schematic view of a recreational vehicle having a slide-out room driven by a releasable drive mechanism according to the present invention.

Referring to the drawings in more detail, and in particular to FIG. 1, the reference number 1 generally designates a drive mechanism used in a recreational vehicle A to extend and retract a slide-out room B. The drive mechanism 1 is connected to a room actuating mechanism C which is connected between the slide-out room B and the recreational vehicle A and serves to move the slide-out room B relative to the recreational vehicle A. The room actuating mechanism C may be, for example, a rack-and-pinion mechanism (shown schematically in FIG. 1), a screw jack mechanism, or other similar mechanism.

Figure 2:
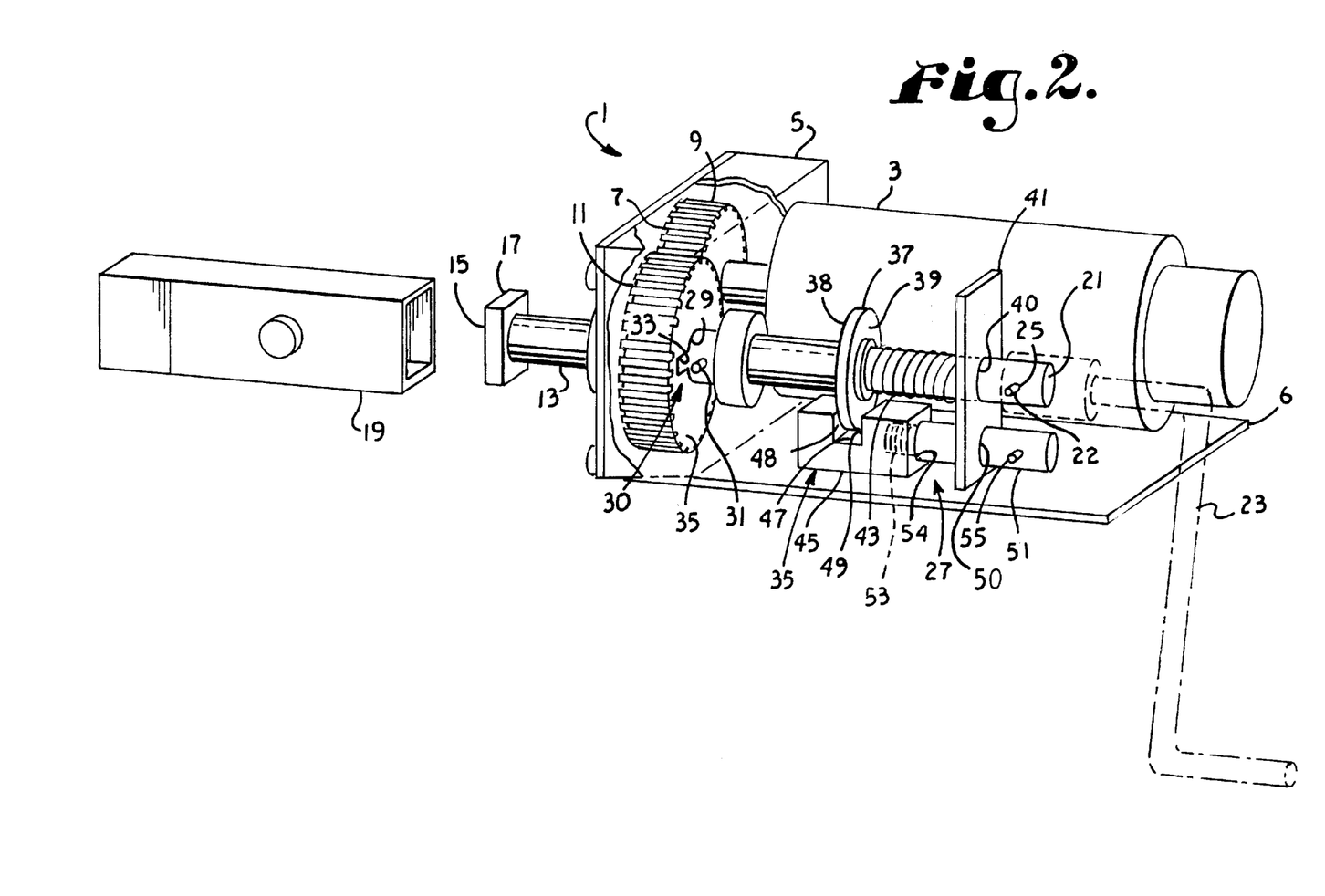
FIG. 2 is a perspective view of a first embodiment of the releasable drive mechanism.

A seen in FIG. 2, the drive mechanism 1 includes a reversible electric motor 3 connected to a gearbox 5. The motor 3 and gearbox 5 may be fixedly mounted on a base plate 6. The gearbox 5 includes an internal geartrain 7 having at least a drive gear 9 and an output gear 11 (see, for example, FIG. 2). The drive gear 9 is driven by the motor 3 such that power is transmitted through the geartrain 7 to the output gear 11. The output gear 11 is connected to a drive shaft 13, which is, in turn, connected to the room actuating mechanism C.

Figure 3:
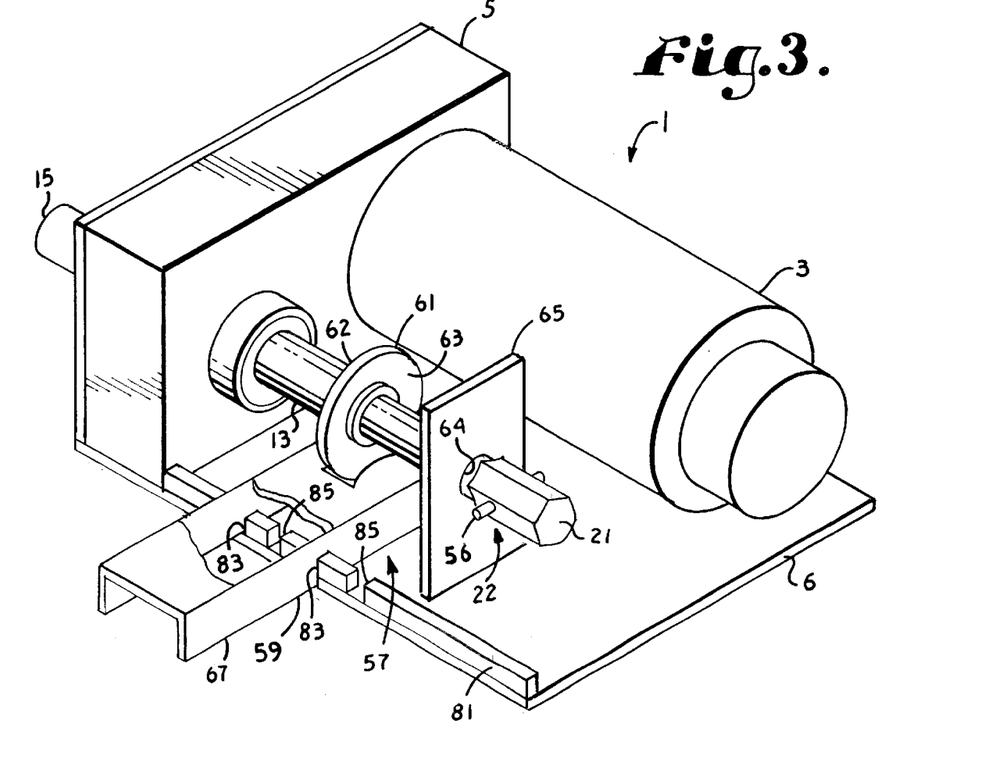
FIG. 3 is a fragmentary perspective view of a second embodiment of the releasable drive mechanism of the present invention.
Figure 5:
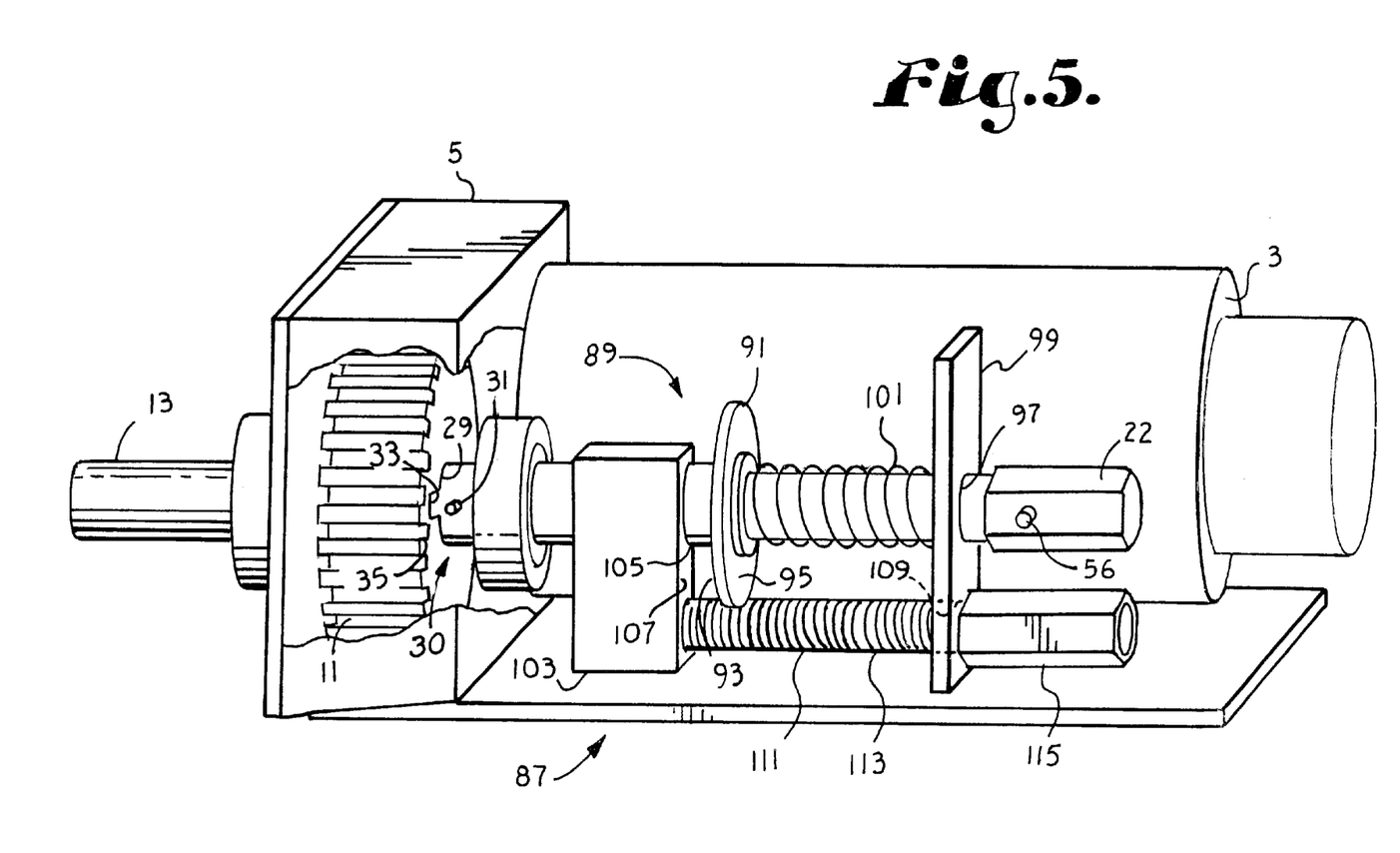
FIG. 5 is a perspective view of a third embodiment of the releasable drive mechanism of the present invention.

The drive shaft 13 has a first end 15 which is depicted as having a square drive member 17 attached thereto. The drive member 17 is received within a square connection tube 19. For reasons which will shortly become apparent, the drive member 17 is slidable within the tube 19 to allow longitudinal movement of the drive shaft 13 relative to the tube 19. Pins 20 retain the tube 19 in position on the drive shaft 13 (as best seen in FIG. 1). The drive shaft 13 further includes a second end 21 having handle connection means 22 for attaching a crank handle 23. The handle connection means 22 may comprise a bayonet pin 25 (as shown in FIG. 2), a hex head (as shown in FIGS. 3 and 5), or any structure which is similarly engageable by a crank handle 23 having a socket shaped to matingly conform to the shape of the handle connection means 22.

First Embodiment

The present invention includes a release mechanism for selectively releasing the drive shaft 13 from the output gear 11 so that the drive shaft 13 may be turned with the crank handle 23 without also rotating the output gear 11. A first embodiment of the release mechanism is shown in FIG. 2 and is generally indicated by the reference numeral 27. In order to facilitate release of the drive shaft 13 from the output gear 11, the drive shaft 13 is longitudinally slidable through a center hole 29 in the gear 11 and includes clutch means 30 for selectively transmitting rotational motion between the drive shaft 13 and the gear 11. The clutch means 30 employed may be of any of a wide variety of known designs and geometries, including frictional and sprag clutches. For example, it is also foreseen that the clutch means 30 could compromise a multifaceted surface formed on the drive shaft with a correspondingly shaped receiver formed in the gear 11.

One simple clutch means 30 comprises a bayonet pin 31 passing through the drive shaft 13 which is engageable with a notch 33 formed in a face 35 of the output gear 11 so as to extend radially outward from the center hole 29. The drive shaft 13 is moveable between an engaged position wherein the pin 31 is received within the notch 33 and a released position wherein the pin 31 is free of the notch 33 as shown in FIG. 2. When the drive shaft 13 is in the engaged position, rotation of the output gear 11 will cause rotation of the drive shaft 13 and vice versa. When the drive shaft 13 is in the released position, neither rotation of the drive shaft 13 nor rotation of the output gear 11 will cause rotation of the other.

Longitudinal movement of the drive shaft 13 is selectively induced through a shift mechanism 35, which includes a collar, annular plate or washer 37 which is fixedly attached to the drive shaft 13 so as to extend radially outward therefrom. The washer 37 includes a forward face 38 and a rearward face 39. The drive shaft 13 further extends through an upper opening 40 in a generally vertical plate 41 which is fixedly secured to the base plate 6. A compression spring 43 positioned between the vertical plate 41 and the washer 37 on the drive shaft 13 serves to urge the drive shaft 13 toward the output gear 11 and into the engaged position.

Positioned beneath the drive shaft 13 and slidably mounted on the base plate 6 is a shift block 45 having a transverse notch or groove 47 which receives a portion of the washer 37. The groove 47 has a forward edge 48 and, optionally, a rearward edge 49. Connected to the shift block 45 and extending through a lower opening 50 in the vertical plate 41 is a jackscrew 51. The jackscrew 51 includes right hand threads 53 which threadably engage a threaded bore 54 formed in the shift block 45. A distal end of the jackscrew 51 includes handle connection means 55 similar to the handle connection means 22 for attaching the crank handle 23 to the jackscrew 51.

In use, an operator disengages the drive mechanism 1 by placing the crank handle 23 on the handle connection means 55 of the jackscrew 51 and uses the crank handle 23 to turn the jackscrew 51 several turns in a clockwise direction. This will pull the shift block 45 toward the vertical plate 41. As the shift block 45 moves, the forward edge 48 of the groove 47 will engage the forward face 38 of the washer 37 and thereby pull the drive shaft 13 toward the vertical plate 41 against the bias of the spring 43. As the drive shaft 13 moves, the bayonet pin 31 is pulled out of the notch 33, disengaging the drive shaft 13 from the output gear 11. The jackscrew 51 also acts to retain the drive shaft 13 in the disengaged position.

Once the pin 31 is released from the notch 33, the crank handle 23 is moved to the handle connection means 22 of the drive shaft 13, where it is used to manually turn the drive shaft 13. Because the drive shaft 13 is no longer engaged with the output gear 11, neither the geartrain 7 nor the motor 3 will be turned as the drive shaft 13 is rotated.

It should be noted that the pin-type clutch means 30, as described above, can be damaged by attempting to turn the drive shaft 13 with the crank 23 without first disengaging the bayonet pin 31 from the notch 33. The extra force required to turn the motor 3 in addition to the room actuating mechanism C may cause the bayonet pin 31 to shear off. Since the pin 31 is located inside the gearbox 5, it is not easily replaced. In order to prevent shearing of the bayonet pin 31, the handle connection means 22 on the shaft 13 preferably includes a shear pin which will shear off before the bayonet pin 31 can be damaged. In the case of a handle connection means 22 which comprise a bayonet pin 25 (as in FIG. 2), the pin 25 would be the shear pin. If the handle connection means 22 comprises a hex head (as in FIGS. 3 and 5), the shear pin may be a pin 56 connecting the hex head to the drive shaft 13.

To re-engage the drive shaft 13 with the output gear 11, the operator again places the crank handle 23 on the handle connection means 55 of the jackscrew 51 and uses the handle 23 to turn the jackscrew 51 a number of turns in a counter-clockwise direction equal to the number of turns used to disengage the drive shaft 13 from the output gear 11. This will push the shift block 45 toward the output gear 11.

As the shift block 45 moves, the spring 43 pushing against the washer 37 drives the drive shaft 13 toward the output gear 11. The forward face 38 of washer 37 generally follows the forward edge 48 of the shift block 45 as it moves toward the output gear 11. In most instances, the pin 31 will not initially be aligned with the notch 33 and will bear against the face 35 of the output gear 11. As the output gear 11 begins to turn upon actuation of the motor 3, however, the pin 31 will pop or advance into the notch 33 and be retained in the notch 33 by the urging of the spring 43. The spring 43 thus acts to retain the drive shaft 13 in the engaged position.

It should be noted that the groove 47 is of sufficient width that the rearward edge 49 of the groove 47 will not bear against the rearward face 39 of the washer 37 when the pin 31 comes into contact with the front face 35 of the output gear 11, unless the operator over-tightens the jackscrew 51. The width of the groove 47 also allows clearance room for the pin 31 to pop into the notch 33 before the forward face 38 of the washer 37 contacts the forward edge 48 of the groove 47.

Second Embodiment

A second embodiment of the release mechanism is shown in FIG. 3 and is generally indicated by the reference numeral 57. As was the case with the first embodiment 27 of the release mechanism, the second embodiment 57 controls longitudinal movement of the drive shaft 13 which is longitudinally slidable through a center hole 29 in the output gear 11 and includes clutch means 30 for selectively transmitting rotational motion between the drive shaft 13 and the gear 11. The clutch means 30 may, again, comprise a bayonet pin 31 passing through the drive shaft 13 which is engageable with a notch 33 formed in a face 35 of the output gear 11 so as to extend radially outward from the center hole 29. It is to be understood, however, that a wide variety of known equivalent clutch means could be used in place of the pin 31 and notch 33.

Longitudinal movement of the drive shaft 13 is selectively induced through a shift mechanism 59, which includes a collar, annular plate or washer 61 which is fixedly attached to the drive shaft 13 so as to extend radially outward therefrom. The washer 61 includes a forward face 62 and a rearward face 63. The drive shaft 13 further extends through an opening 64 in a generally vertical plate 65 which is fixedly secured to the base plate 6.

Figure 4:
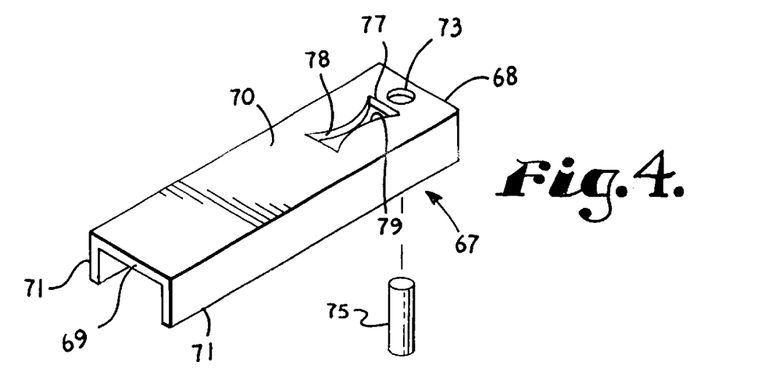
FIG. 4 is a perspective view of a shift lever of the releasable drive mechanism shown in FIG. 3.

The shift mechanism 59 further includes a shift lever 67 which is pivotally connected to the base plate 6 and positioned beneath the drive shaft 13. As best seen in FIG. 4, the shift lever 67 has a proximate end 68, a distal end 69, and comprises an elongate top plate 70 and a pair of downwardly extending side plates 71 which are fixedly connected to the top plate 70 along opposed side edges thereof. The top plate 70 includes a pin receiver 73 which is positioned near the proximate end 68 and receives a pivot pin 75 which provides the pivotal connection to the base plate 6.

The top plate 70 further includes an opening 77 having a forward edge 78 and a rearward edge 79. The edges 78 and 79 are both inwardly curved, giving the opening 77 a generally hourglass shape. Referring again to FIG. 3, the opening 77 receives a lower portion of the washer 61. As the lever 67 is pivoted about the pivot pin 75 in a forward direction, the rearward edge 79 the opening 77 engages the rearward face 63 of the washer 61 and thereby moves the drive shaft 13 in a forward direction. Conversely, as the lever 67 is pivoted in a rearward direction, the forward edge 78 of the opening 77 engages the forward face 62 of the washer 61 and thereby moves the drive shaft 13 in a rearward direction.

The shift mechanism 59 also includes retention means for selectively retaining the shift lever 67 in a forward or engaged position wherein the bayonet pin 31 is engaged with the notch 33 and in a rearward or disengaged position wherein the bayonet pin 31 is disengaged from the notch 33. One suitable retention means comprises a latch plate 81 which may be secured to the base plate 6 along an edge thereof below the shift lever 67. The latch plate 81 includes a pair of forward notches or stops 83 which engage a portion of the side plates 71 of the shift lever 67 when the lever 67 is in the engaged position and a pair of rearward notches or stops 85 which engage a portion of the side plates 71 when the lever 67 is in the disengaged position. With a retention means of this type, the pivotal connection between the pin receiver 73 and the pivot pin 75 must allow the shift lever 67 to also move upwardly and downwardly so that it can be moved into and out of engagement with the notches 83 and 85. It is foreseen that a wide variety of retention means could be utilized including for example pins extending upward from base plate 6 to mate with a hold in the shift lever 67 or other mating type structure In use, an operator disengages the drive mechanism 1 by pulling upwardly on the distal end 69 of the shift lever 67 such that the side plates 71 are lifted free of the forward notches 83 in the latch plate 81. The operator then pulls rearwardly on the distal end 69 such that the shift lever 67 pivots about the pivot pin 75. As the shift lever 67 is pivoted, the forward edge 78 of the hourglass shaped opening 77 engages the forward face 62 of the washer 61. The forward edge 78 of the opening 77 pushes against the washer 61 such that the drive shaft 13 is moved rearwardly. As the drive shaft 13 moves, the bayonet pin 31 is pulled out of the notch 33, disengaging the drive shaft 13 from the output gear 11. When the side plates 71 are positioned above the rearward notches 85, the operator moves the distal end 69 of the shift lever 67 downwardly until the side plates 71 are brought into engagement with the notches 85. The notches 85 act to retain the shift lever 67 in the rearward position until such time as the operator wishes to re-engage the drive shaft 13 with the output gear 11.

With the drive shaft 13 disengaged from the output gear 11, the operator can place the crank handle 23 on the handle connection means 22 of the drive shaft 13 and use it to manually turn the drive shaft 13. Neither the geartrain 7 nor the motor 3 will be turned as the drive shaft 13 is rotated.

To re-engage the drive shaft 13 with the output gear 11, the operator pulls upwardly on the distal end 69 of the shift lever 67 such that the side plates 71 are lifted free of the forward notches 85 in the latch plate 81. The operator then moves or pivots the distal end 69 of the shift lever 67 in a forward direction such that the lever 67 pivots about the pivot pin 75. As the shift lever 67 is pivoted, the rearward edge 79 of the hourglass shaped opening 77 engages the rearward face 63 of the washer 61 and pushes the drive shaft 13 in a forward direction. As the drive shaft 13 moves, the bayonet pin 31 is pushed toward the output gear 11.

In order to align the bayonet pin 31 with the notch 33, the operator must turn the drive shaft 13 with the crank handle 23 while continuing to ease the lever 67 in a forward direction. As soon as the pin 31 comes into alignment with the notch 33, the pin 31 will slide into the notch 33. When this occurs, the side plates 71 of the lever 67 will be above the forward notches 83 in the latch plate 81. By moving the lever 67 downwardly, the operator can engage the side plates 71 with the notches 83 such that the latch plate 81 retains the lever 67 in the forward position. The nominal width of the hourglass shaped opening 77 is narrow enough that the rearward edge 79 thereof will continue to engage the rearward face 63 of the washer 61 so as to prevent rearward movement of the shaft 13.

Third Embodiment

A third embodiment of the release mechanism is shown in FIG. 5 and is generally indicated by the reference numeral 87. As was the case in the previous two embodiments the drive shaft 13 is longitudinally slidable through a center hole 29 in the output gear 11 and includes clutch means 30 for selectively transmitting rotational motion between the drive shaft 13 and the gear 11. The clutch means 30 is again depicted as a bayonet pin 31 passing through the drive shaft 13 which is engageable with a notch 33 formed in a face 35 of the output gear 11.

Longitudinal movement of the drive shaft 13 is selectively induced through a slit mechanism 89, which includes a collar, annular plate or washer 91 which is fixedly attached to the drive shaft 13 so as to extend radially outward therefrom. The washer 91 includes a forward face 93 and a rearward face 95. The drive shaft 13 further extends through an upper opening 97 in a generally vertical plate 99 which is fixedly secured to the base plate 6. A compression spring 101 positioned between the vertical plate 99 and the washer 91 serves to urge the drive shaft 13 toward the output gear 11, such that the bayonet pin 31 is urged into engagement with the notch 33.

Positioned beneath the drive shaft 13 and slidably mounted on the base plate 6 is a shift block 103 having a bore or receiver 105 formed therethrough. The bore 105 slidably receives the drive shaft 13. The block 103 has a rearward face 107 adjacent the forward face 93 of the washer 91. Fixedly connected to the shift block 103 and extending through a lower opening 109 in the vertical plate 99 is a threaded rod 111. The threaded rod 111 includes right hand 113 which threadably engage an elongate nut 115 positioned rearwardly of the vertical plate 99. The nut 115 is engageable by the crank handle 23.

In use, an operator disengages the drive mechanism 1 by placing the crank handle 23 on the nut 115 and uses the crank handle 23 to turn the nut 115 several turns in a clockwise direction. This will pull the shift block 103 toward the vertical plate 99. As the shift block 103 moves, the rearward edge 107 of the block 103 will engage the forward face 93 of the washer 91 and thereby pull the drive shaft 13 toward the vertical plate 99 against the bias of the spring 101. As the drive shaft 13 moves, the bayonet pin 31 is pulled out of the notch 33, disengaging the drive shaft 13 from the output gear 11. The nut 115 also acts to retain the shaft 13 in the disengaged position.

With the drive shaft 13 disengaged from the output gear 11, the operator can place the crank handle 23 on the handle connection means 22 of the drive shaft 13, where it is used to manually turn the drive shaft 13. Because the drive shaft 13 is no longer engaged with the output gear 11, neither the geartrain 7 nor the motor 3 will be turned as the drive shaft 13 is rotated.

To re-engage the drive shaft 13 with the output gear 11, the operator again places the crank handle 23 on the nut 115 and uses the handle 23 to turn the nut 115 a number turns in a counter-clockwise direction equal to the number of turns used to disengage the drive shaft 13 from the output gear 11. This will allow the spring 101 to push the drive shaft 13 and the shift block 103 toward the output gear 11. In most instances, the pin 31 will not initially be aligned with the notch 33 and will bear against the face 35 of the output gear 11. As the output gear 11 begins to turn upon actuation of the motor 3, however, the pin 31 will pop or advance into the notch 33 and be retained in the notch 33 by the urging of the spring 101. It is to be understood that the spring may only partially advance the pin 31 into the aligned notch 33 and that the user may need to turn the nut 115 counter clockwise to drive the pin 31 into a fully seated relationship with the notch 33. The spring 101 thus acts to retain the shaft 13 in the engaged position.

It is to be understood that while certain forms of the present invention have been illustrated and described herein, it is not to be limited to the specific forms or arrangement of parts described and shown. For example, in the first embodiment described above, it would be possible to eliminate the spring 43 and to use the rearward edge 49 of the groove 47 to push against the rearward face 39 of the washer 37 to urge the drive shaft 13 in the forward direction when re-engaging the drive shaft 13 with the output gear 11. This variation is not considered to be a preferred embodiment when used with the pin-type clutch because it would provide too great a risk of shearing off the pin 31 if the jackscrew 51 were over-tightened with the pin 31 misaligned with the notch 33. Such a device, however, is considered to be within the scope of the present invention. In such a case, the jackscrew 51 would act to retain the drive shaft 13 in the engaged position.

It is also to be understood that although the drive mechanism 1 is described herein as having a geartrain 7 located in a gearbox 5, the electric motor 3 could also be connected to the output shaft 13 through a drive chain, a drive belt, or other similar drive connection. In embodiments utilizing these types of drive mechanisms, sprockets or pulleys would replace the toothed input gear 9 and output gear 11 shown. The term "drive train" as used herein is therefore to be understood to include these types of drives, as well as geartrains. The terms "input gear" and "output gear" are therefore not to be limited to toothed gears, but are also to be understood to include chain sprockets, belt pulleys, and other similar drive members.

What is claimed and desired to be secured by Letters Patent is as follows:

1. An apparatus for moving a slide-out room of a recreational vehicle, comprising:

a) a room actuation mechanism connected between the slide out room and the recreational vehicle; and
b) a drive mechanism comprising:
   i) a drive train with a drive gear and an output gear, said output gear having a center hole formed therethrough;
   ii) an electric motor connected to said drive gear;
   iii) a drive shaft having a first end and a second end, said first end being operatively connected to said room actuation mechanism, said drive shaft being received through said center hole of said output gear and movable relative to said output gear in opposed first and second longitudinal directions;
   iv) a clutch connected to said drive shaft operable to engage said drive shaft with said output gear as said drive shaft is moved in said first longitudinal direction and disengage said drive shaft from said output gear as said drive shaft is moved in said second longitudinal direction;
   v) a shift mechanism for selectively moving said drive shaft between an engaged position wherein said drive shaft is engaged with said output gear through said clutch and a disengaged position wherein said drive shaft is disengaged from said output gear; and
   vi) a crank handle connectable to said drive shaft second end.

2. A drive assembly for a slide-out room of a recreational vehicle, comprising:
   a) a drive train with a drive gear and an output gear, said output gear having a center hole formed therethrough;
   b) an electric motor operatively connected to said drive gear;
   c) a drive shaft having a first end and a second end, said drive shaft being received through said center hole of said output gear and movable relative to said output gear in opposed first and opposed longitudinal directions;
   d) clutch means connected to said drive shaft for engaging said drive shaft with said output gear as said drive shaft is moved in said first longitudinal direction and disengaging said drive shaft from said output gear as said drive shaft is moved in said second longitudinal direction;
   e) shift means for selectively moving said drive shaft between an engaged position wherein said drive shaft is engaged with said output gear through said clutch means and a disengaged position wherein said drive shaft is disengaged from said output gear;
   f) retaining means for retaining said drive shaft in either said engaged position or said disengaged position;
   g) a drive member connected to said drive shaft first end and engageable with a room actuation mechanism; and
   h) handle connection means on said drive shaft second end for engaging a crank handle.

3. The drive assembly as in claim 2 wherein said clutch means comprises:
   a) a notch formed in a face of said output gear so as to extend radially outward from said center hole; and
   b) a pin extending radially outward from said drive shaft, said pin being receivable within said notch to engage said drive shaft with said output gear.

4. The drive assembly as in claim 2 wherein said shift means comprises:
   a) a washer fixedly attached to said drive shaft so as to extend radially outward therefrom;
   b) a shift block slidably mounted adjacent said drive shaft and moveable in said opposed first and second longitudinal directions, said shift block having a first surface which engages a portion of said washer when said shift block is moved in said second longitudinal direction and thereby urges said drive shaft into said disengaged position; and
   c) means for moving said shift block in said opposed first and second longitudinal directions.

5. The drive assembly as in claim 4 and further including a spring urging said drive shaft in said first longitudinal direction.

6. The drive assembly as in claim 4 wherein said shift block includes a second surface which engages a portion of said washer when said shift block is moved in said first longitudinal direction and thereby urges said drive shaft into said engaged position.

7. The drive assembly as in claim 2 wherein said shift means comprises:
   a) a washer fixedly attached to said drive shaft so as to extend radially outward therefrom;
   b) a spring biasing said drive shaft in said second longitudinal direction;
   c) a shift block slidably mounted adjacent said drive shaft, said shift block having a first surface engageable with a portion of said washer; and
   d) a jack screw connected to said shift block and operable to selectively move said shift block in said first and second longitudinal direction; wherein
   e) turning said jack screw in a first rotational direction causes said first surface to engage said washer and move said drive shaft in said first longitudinal direction against the bias of said spring, thereby causing said clutch means to disengage said drive shaft from said output gear; and
   f) turning said jack screw in a second rotational direction opposite said first rotational direction allows said spring to urge said drive shaft in said second longitudinal direction, thereby causing said clutch means to engage said drive shaft with said output gear.

8. The drive assembly as in claim 2 wherein said shift means comprises:
   a) a washer fixedly attached to said drive shaft so as to extend radially outward therefrom;
   b) a shift lever having a proximate end, a distal end, and an opening formed between said proximate and distal ends, said shift lever being mounted adjacent said drive shaft for pivotal movement about said proximate end, said opening having opposed, inwardly curved, edges and receiving a portion of said washer; wherein
   c) pivoting said shift lever in a first direction moves said drive shaft in said first longitudinal direction causing said clutch means to disengage said drive shaft from said output gear; and
   d) pivoting said shift lever in a second direction opposite said first direction moves said drive shaft in said second longitudinal direction causing said clutch means to engage said drive shaft with said output gear.

9. The drive assembly as in claim 8, wherein said retaining means comprises a latch plate having a first notch and a second notch, said first notch receiving said shift lever when said drive shaft is in said engaged position and said second notch receiving said shift lever when said drive shaft is in said disengaged position.

10. A drive assembly for a slide-out room of a recreational vehicle, comprising:

a) a drive train with a drive gear and an output gear, said output gear having a center hole formed therethrough and a notch formed in a first face of said output gear so as to extend radially outward from said center hole;

b) an electric motor connected to said drive gear;

c) a drive shaft having a first end and a second end, said drive shaft being received through said center hole of said output gear and movable relative to said output gear in opposed first and second longitudinal directions;

d) a pin extending radially outward from said shaft, said pin being receivable within said notch in said output gear;

e) shift means for selectively moving said drive shaft between an engaged position wherein said pin is engaged with said notch in said output gear and a disengaged position wherein said pin is disengaged from said notch in said output gear and for retaining said drive shaft in one of said engaged and disengaged positions;

f) a drive member connected to said drive shaft first end engageable with a room actuation mechanism; and g) handle connection means on said drive shaft second end for engaging a crank handle.

11. The drive assembly as in claim 10 wherein said shift means comprises:

a) a washer fixedly attached to said drive shaft so as to extend radially outward therefrom;

b) a spring biasing said drive shaft in said second longitudinal direction;

c) a shift block slidably mounted adjacent said drive shaft, said shift block having a transverse groove formed therein, said groove receiving a portion of said washer; and d) a jack screw connected to said shift block and operable to move said shift block in said first and second longitudinal directions; wherein e) turning said jack screw in a first rotational direction causes an edge of said groove to engage said washer and move said drive shaft in said first longitudinal direction against the bias of said spring, thereby causing said pin to pull out of said notch; and f) turning said jack screw in a second rotational direction opposite said first rotational direction allows said spring to urge said drive shaft in said second longitudinal direction, thereby allowing said notch to receive said pin.

12. The drive assembly as in claim 10 wherein said shift means comprises:

a) a washer fixedly attached to said drive shaft so as to extend radially outward therefrom;

b) a shift lever having a proximate end, a distal end, and an opening formed between said proximate and distal ends, said shift lever being mounted adjacent said drive shaft for pivotal movement about said proximate end, said opening having opposed, inwardly curved, edges and receiving a portion of said washer; wherein c) pivoting said shift lever in a first direction moves said drive shaft in said first longitudinal direction, thereby causing said pin to pull out of said notch; and d) pivoting said shift lever in a second direction opposite said first direction moves said drive shaft in said second longitudinal direction allowing said notch to receive said pin.

13. The drive assembly as in claim 12 and further including retaining means for selectively retaining said drive shaft in said engaged position or said disengaged position.

14. The drive assembly as in claim 13, wherein said retaining means comprises a latch plate having a first notch and a second notch, said first notch receiving said shift lever when said drive shaft is in said engaged position and said second notch receiving said shift lever when said drive shaft in said disengaged position.

15. A drive assembly for a slide-out room of a recreational vehicle, comprising:

a) a drive train with a drive gear and an output gear, said output gear having a center hole formed therethrough and a notch formed in a first face of said output gear so as to extend radially outward from said center hole;

b) an electric motor connected to said drive gear;

c) a drive shaft having a first end and a second end, said drive shaft being received through said center hole of said output gear and movable relative to said output gear in opposed first and second longitudinal directions;

d) a pin extending radially outward from said shaft, said pin being receivable within said notch in said output gear;

e) a washer fixedly attached to said drive shaft so as to extend radially outward therefrom;

f) a shift lever having a proximate end, a distal end, and an opening formed between said proximate and distal ends, said shift lever being mounted adjacent said drive shaft for pivotal movement about said proximate end, said opening having opposed, inwardly curved edges and receiving a portion of said washer;

g) a drive member connected to said drive shaft first end engageable with a room actuation mechanism; and h) handle connection means on said drive shaft second end for engaging a crank handle; wherein i) pivoting said shift lever in a first direction moves said drive shaft in said first longitudinal direction, thereby causing said pin to pull out of said notch; and j) pivoting said shift lever in a second direction opposite said first direction moves said drive shaft in said second longitudinal direction allowing said notch to receive said pin.

16. The drive assembly as in claim 15 and further including a latch plate having a first stop and a second stop, said first stop engaging said shift lever when said drive shaft is in an engaged position wherein said pin is received within said notch and said second stop engaging said shift lever when said drive shaft in a disengaged position wherein said pin is free of said notch.

17. The drive assembly as in claim 4 wherein said means for moving comprises a jack screw connected to said shift block.

* * * * *